United States Patent
Rinaldi et al.

(10) Patent No.: US 6,340,851 B1
(45) Date of Patent: Jan. 22, 2002

(54) MODULAR TRANSFORMER ARRANGEMENT FOR USE WITH MULTI-LEVEL POWER CONVERTER

(75) Inventors: Peter M. Rinaldi, Mystic, CT (US); Edgar S. Thaxton, Bradford, RI (US); Gene Castles, Preston, CT (US)

(73) Assignee: Electric Boat Corporation, Groton, CT (US)

(*) Notice: Subject to any disclaimer, the term of this patent is extended or adjusted under 35 U.S.C. 154(b) by 0 days.

(21) Appl. No.: 09/473,492

(22) Filed: Dec. 28, 1999

Related U.S. Application Data

(63) Continuation-in-part of application No. 09/300,236, filed on Apr. 27, 1999, now Pat. No. 6,101,109, which is a continuation-in-part of application No. 09/046,076, filed on Mar. 23, 1998, now Pat. No. 5,933,339.

(51) Int. Cl.$^7$ .................................................. H02J 1/00
(52) U.S. Cl. .................................... 307/82; 307/83
(58) Field of Search ...................... 363/71, 41, 132; 388/811; 307/17, 83, 82

(56) References Cited

U.S. PATENT DOCUMENTS

| | | |
|---|---|---|
| 2,307,527 A | 1/1943 | Maslin et al. |
| 2,632,878 A | 3/1953 | Uhlmann |
| 2,667,617 A | 1/1954 | Boyajian |
| 2,820,189 A | 1/1958 | Uhlmann |
| 3,016,484 A | 1/1962 | Mulder et al. |
| 3,609,507 A | 9/1971 | Beck |
| 3,622,863 A | 11/1971 | King |
| 3,636,430 A | 1/1972 | Kernick et al. |
| 3,775,663 A | 11/1973 | Turnbull |
| 3,970,914 A | 7/1976 | Salzmann et al. |
| 4,058,759 A | 11/1977 | Halfhill |
| 4,084,221 A | 4/1978 | Ogata |
| 4,172,991 A | 10/1979 | Akamatsu et al. |
| 4,173,779 A | 11/1979 | Abbondanti et al. |
| 4,208,621 A | 6/1980 | Hipkins et al. |
| 4,220,896 A | 9/1980 | Paice |
| 4,276,589 A | 6/1981 | Okawa et al. |
| 4,317,166 A | 2/1982 | Winkler et al. |
| 4,349,772 A | 9/1982 | Weiss |
| 4,370,703 A | 1/1983 | Risberg |
| 4,394,610 A | 7/1983 | Dolland |
| 4,500,821 A | 2/1985 | Bitting et al. |
| 4,638,178 A | 1/1987 | Kayser |
| 4,663,702 A | 5/1987 | Tanaka |
| 4,674,024 A | 6/1987 | Paice et al. |
| 4,678,986 A | 7/1987 | Barthelemy |
| 4,730,150 A | 3/1988 | Lee et al. |
| 4,779,034 A | 10/1988 | Shepard, Jr. |
| 4,814,965 A | 3/1989 | Petersen |
| 4,928,042 A | 5/1990 | Harms et al. |
| 4,947,100 A | 8/1990 | Dhyanchand et al. |
| 4,965,709 A | 10/1990 | Ngo |
| 5,031,088 A | 7/1991 | Tanaka |
| 5,214,366 A | 5/1993 | Hollmann |
| 5,221,881 A | 6/1993 | Cameron |
| 5,233,280 A | 8/1993 | Ghosh |
| 5,317,299 A | 5/1994 | Dhyanchand et al. |
| 5,317,498 A | 5/1994 | Dhyanchand et al. |

(List continued on next page.)

Primary Examiner—Shawn Riley
(74) Attorney, Agent, or Firm—BakerBotts, LLP

(57) ABSTRACT

A modular transformer arrangement providing power to a multi-level power converter includes a plurality of three phase transformers having delta or extended delta connected primary windings and delta or extended delta or wye or zig zag wye connected secondary windings and the multi-level power converter has full bridge power modules inputs connected to isolated secondaries of the transformer modules and outputs connected in series and/or in parallel to provide increased voltage and/or current or multiple phases which can be phase shifted with respect to the input to the transformer.

13 Claims, 14 Drawing Sheets

U.S. PATENT DOCUMENTS

| | | |
|---|---|---|
| 5,331,303 A | 7/1994 | Shiota |
| 5,334,921 A | 8/1994 | Wehberg |
| 5,337,227 A | 8/1994 | Stacey et al. |
| 5,373,436 A | 12/1994 | Yamaguchi et al. |
| 5,402,054 A | 3/1995 | Eckersley |
| 5,404,123 A | 4/1995 | Joseph |
| 5,426,354 A | 6/1995 | Bausch |
| 5,434,455 A | 7/1995 | Kammeter |
| 5,434,770 A | 7/1995 | Dreifuerst et al. |
| 5,460,244 A | 10/1995 | Tanahashi |
| 5,491,393 A | 2/1996 | Uesugi |
| 5,514,944 A | 5/1996 | Miyazaki |
| 5,515,264 A | 5/1996 | Stacey |
| 5,517,063 A | 5/1996 | Schantz, Jr. et al. |
| 5,552,685 A | 9/1996 | Young et al. |
| 5,602,725 A | 2/1997 | Venkataramanan |
| 5,625,545 A | 4/1997 | Hammond |
| 5,638,263 A | 6/1997 | Opal et al. |
| 5,644,483 A | 7/1997 | Peng et al. |
| 5,657,217 A | 8/1997 | Watanabe et al. |
| 5,671,127 A | 9/1997 | Maezawa et al. |
| 5,687,071 A | 11/1997 | Debruyne et al. |
| 5,703,767 A | 12/1997 | Stacey |
| 5,731,970 A | 3/1998 | Mori et al. |
| 5,757,633 A | 5/1998 | Bowles |
| 5,801,936 A | 9/1998 | Mori et al. |
| 5,909,367 A | 6/1999 | Change |
| 5,929,519 A | 7/1999 | Mori et al. |
| 5,933,339 A | 8/1999 | Duba et al. .................... 363/71 |
| 6,101,109 A | 8/2000 | Duba et al. .................... 363/71 |

PRIMARY PHASE-SHIFTED (-12°)

PRIMARY PHASE-SHIFTED (-24°)

PRIMARY PHASE-SHIFTED (−6°)

PRIMARY PHASE-SHIFTED (+6°)

PRIMARY PHASE-SHIFTED (−12°)

- 315 kW POWER MODULES
- 1MW TRANSFORMER MODULES

MODULAR TRANSFORMER ARRANGEMENT FOR USE WITH MULTI-LEVEL POWER CONVERTER

REFERENCE TO RELATION APPLICATIONS

This application is a continuation-in-part of application Ser. No. 09/300,236 filed Apr. 27, 1999, now U.S. Pat. No. 6,101,109, which is a continuation-in-part of application Ser. No. 09/046,076 filed Mar. 23, 1998, now U.S. Pat. No. 5,933,339.

BACKGROUND OF THE INVENTION

This invention relates to modular electric drive systems and, more particularly, to electric drive systems which provide scalable power levels.

Conventional electric drive systems for supplying power to power conversion equipment that will be utilized to drive a propulsion motor for a ship or provide auxiliary power in the ship, for example, require large transformers, generally 12 pulse transformers. Such conventional electric drive systems usually require a different transformer design for each of several scalable power levels, resulting in disadvantages for the respective size weight and packaging arrangements that cannot be optimized based on the use of a single large transformer.

Medium voltage static AC drives benefit from transformers that can improve power quality and provide isolation. In the case of pulse width modulated (PWM) low voltage drives, several modules are placed in series to obtain higher output voltages and in parallel to provide a higher output currents, providing multi-level power converters. These drives require an isolated input for each module, usually from multiple isolated transformer secondaries, often phase shifted, to provide a required power output. For large motor drives, the transformer volume and weight can become excessive due to the core size, the secondary connections and the cooling methods used. Transformers with high output power ratings and multiple secondary connections are very large and cumbersome. When multiple secondaries with phase shifted outputs are required, a single large core is mechanically impracticable in some applications due to the complexity of the secondary configuration.

The Uhlmann U.S. Pat. No. 2,820,189 describes a static current converter using voltage commutation. As described in that patent, four six-pulse, two-way connected converters are connected to two transformers so as to form a 24-pulse converter with a phase angle of 15°. The Uhlmann patent discloses an arrangement of voltage commutating static current converters operating in different phase so that a short-circuiting of voltage harmonics through the constituent converters is prevented.

The Hammond U.S. Pat. No. 5,625,545 and the Opel et al. U.S. Pat. No. 5,638,263 disclose power conversion systems which utilize phase shifting of a three-phase AC input to provide multiple phases to reduce output ripple and, in this case, H-bridges are provided to effect the switching of different phase components. These patents disclose multiple, isolated secondaries in the input transformer, and delta, wye, extended delta, or zig-zag configurations which have an effect on phase shift. The Opel et al. Patent also discloses the use of multiple transformers rather than a single transformer with one primary winding and multiple secondary windings and different arrangements of power converters based on current and voltage output requirements.

The Maezawa et al. U.S. Pat. No. 5,671,127 describes a high voltage, large output DC power supply device which is of a relatively small size and capable of reducing harmonic currents in its DC output energy. This is accomplished by increasing the number of phases using separate transformers which are connected to provide twelve output phases with primary windings connected in delta and star configurations for shifting the output phases.

Such prior art power supply or conversion arrangements utilize phase shifting transformers to shift from a three phase AC input to provide multiple phase outputs in order to reduce output ripple. None of the prior art transformer arrangements is capable of satisfying the transformer requirements of different power supply arrangements with a minimum weight and volume for each application.

SUMMARY OF THE INVENTION

Accordingly it is an object of the present invention to provide a modular transformer arrangement for multi-level power converters which overcomes disadvantages of the prior art.

Another object of the invention is to provide a power dense modular three dimensional arrangement of low power transformers for use in high power systems so as to avoid the need for multiple transformers of varying design to satisfy varying power requirements for different equipment.

A further object of the invention is to provide a transformer arrangement which eliminates the need for a single large transformer for power electric drive systems which is sometime difficult to manufacture, install and replace.

These and objects of the invention are attained by providing a modular transformer arrangement containing transformer modules which can be used in single or multiple units connected in series and/or in parallel with phase shifting to provide a high power output of improved quality. By utilizing a transformer arrangement made of modular transformer units with the ability to add or subtract units, the transformer output is scaleable for different applications so as to assure the minimum possible transformer size and weight for each requirement. In addition, the manufacture, installation and repair of transformer arrangements are facilitated by the use of modular units.

In a preferred embodiment of the invention, a modular transformer arrangement is connected to supply power to power conversion equipment for driving a motor at variable speed. In other embodiments, a modular transformer arrangement supplies power to power conversion equipment for AC or DC service supply or UPS equipment. Preferably, a modular transformer arrangement combines series and parallel modules in a manner that produces a drive that is scaleable in power with respect to both voltage and current and in phases, utilizing a single common power transformer modular design. For power conversion a high power design is provided that utilizes multiple small modular transformers that produce isolated phase shifted sources of power to an inverter.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Although one preferred embodiment of the invention includes a modular transformer arrangement for supplying power to power conversion equipment to drive a motor at variable speed, other modular transformer arrangements can be used to provide power to conversion equipment for AC or DC service supply or UPS equipment. A preferred power conversion equipment arrangement includes modular transformers supplying power to a motor drive configuration that combines series/parallel power modules to provide a drive which is scaleable in power with respect to both voltage and current and in phases using a single common power module of the type described in U.S. Pat. No 5,933,339, the disclosure of which is incorporated by reference herein. This arrangement is referred to hereinafter as a multi-level PWM inverter. The baseline PWM inverter is a high power design that incorporates multiple small modular transformers that provide isolated phase-shifted sources of power to the inverter.

Figure 1A:
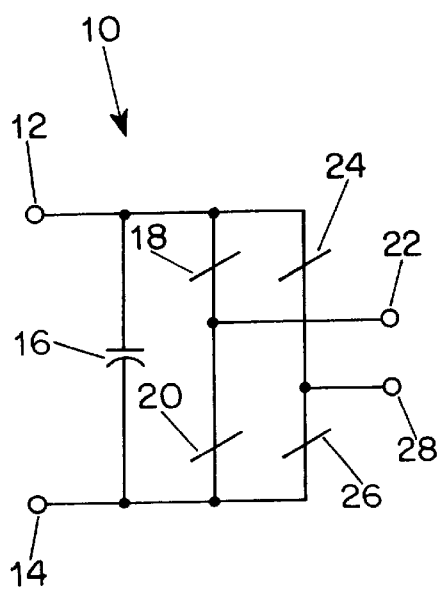
FIG. 1a is a schematic illustration of an H bridge.

The multi-level drive topology includes a collection of power semiconductor switches that are arranged as H bridges or "full bridges" of the type corresponding to the H bridge 10 shown in FIG. 1a. As illustrated in that figure, the H bridge 10 receives DC power from an isolated DC power source through two input terminals 12 and 14 shunted by a capacitor 16 and has two power transistors 18 and 20 connected across the terminals 12 and 14, with the mid-point between those transistors connected to an output terminal 22, and two fuirther power transistors 24 and 26 connected across the terminals 12 and 14 with a mid-point between those transistors connected to another output terminal 28.

Figure 1B:
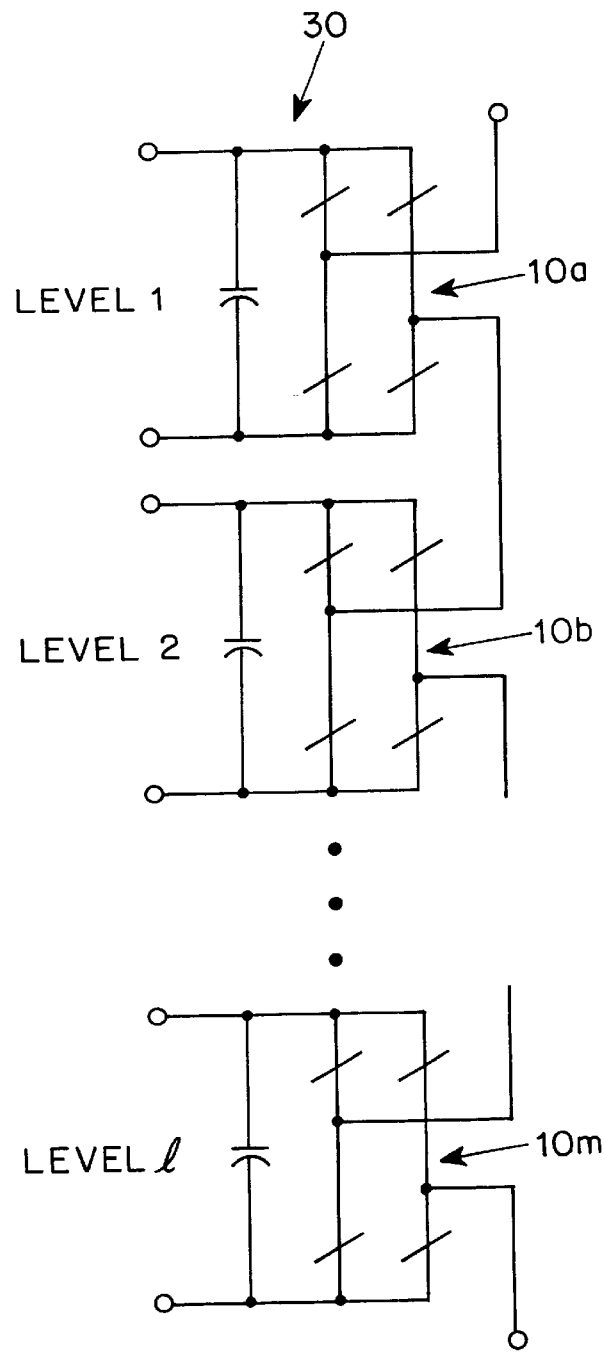
FIG. 1b is a schematic illustration showing the arrangement of a multi-level phase driver utilizing H bridges of the type shown in FIG. 1a to provide an increase in output voltage.

As shown in FIG. 1b, a series of H bridges 10a, 10b . . . 10m, each having its output terminals connected in series to the outputs of adjacent H bridges, provides a multi-level phase driver 30 which produces an output voltage equal to the total of the isolated DC power voltages provided to the input terminals of the H bridges. The H bridges 10a, 10b . . . 10m thus provide separate levels to develop a required line-to-neutral voltage for a particular output phase, the number of levels being determined by the desired drive line-to-line output voltage and by the voltage ratings of the power semiconductor switches 18, 20, 24 and 26 used in the H bridges. This collection of series-connected full bridges is referred to hereinafter as a "multi-level phase driver".

Figure 2:
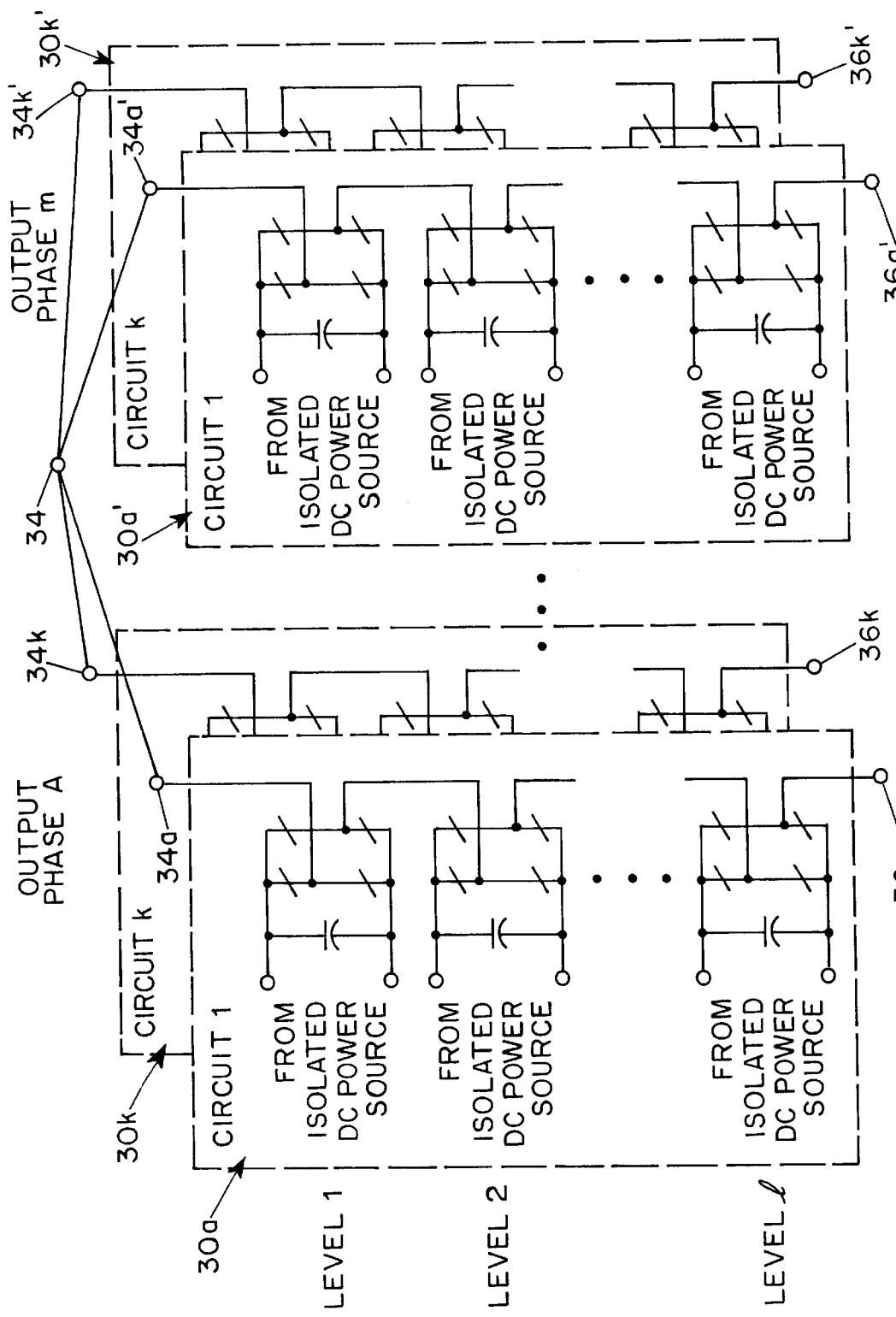
FIG. 2 is a schematic block diagram illustrating the arrangement of multi-level pulse width modulated inverters.

A number of such multi-level phase drivers are interconnected in a wye, delta, or single phase configuration according to the required number of output phases and circuits to be provided, where the number of multi-level phase drivers required is equal to the number of output phases multiplied by the number of output circuits. FIG. 2 illustrates schematically the resulting drive arrangement for a motor in which a plurality of circuits 30a . . . 30k and 30a' . . . 30k' . . . for corresponding output phases A . . . m each have one output terminal 34a . . . 34k and 34a' . . . 34k' connected to a floating neutral 34 and another output terminal 36a . . . 36k and 36a' . . . 36k' which is connected to a corresponding circuit of a corresponding phase of the motor.

Figure 3:
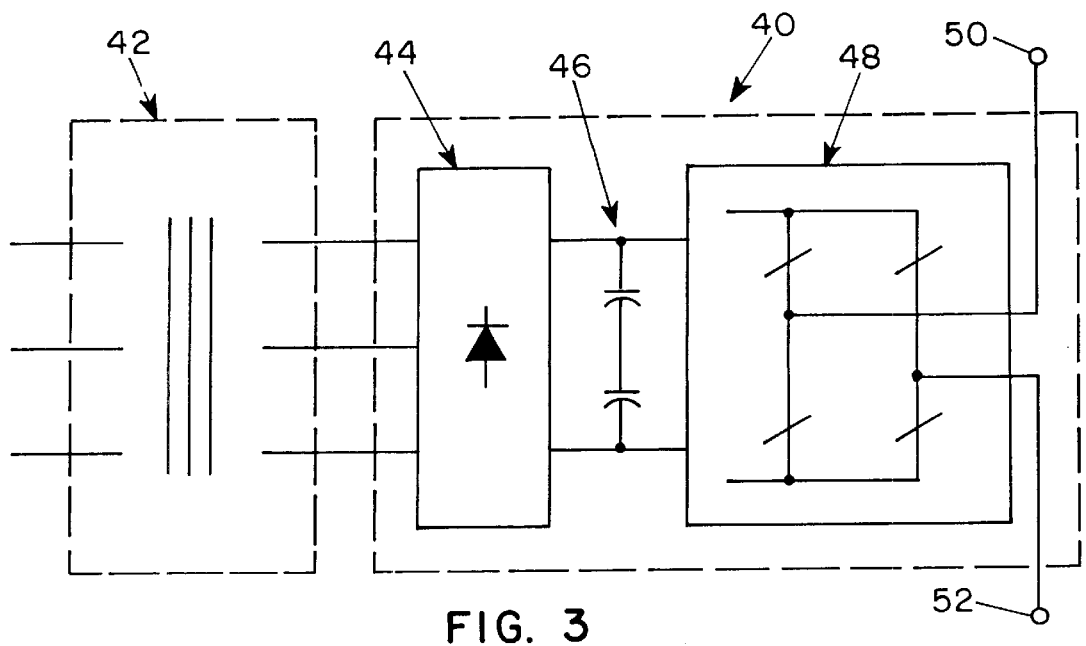
FIG. 3 is a schematic illustration showing an H bridge or "full bridge" power module arranged in accordance with the invention.

FIG. 3 illustrates schematically a full bridge module 40 which receives three phase AC input voltages from secondary windings of a transformer 42 and supplies these voltages to a three phase rectifier 44 which produces a DC output. This output is coupled through a parallel link capacitor arrangement 46 to a single full bridge 48 providing a single phase output at terminals 50 and 52.

The secondary windings of the transformer 42 are phase shifted relatively to each other for improved drive output power quality and reduced input current harmonics. An input transformer 42 of this type permits a medium voltage (5–15 kV) AC distribution system to be provided for industrial and marine applications. Since the transformer steps down the system voltage before providing the input to the drive power electronics, the drive output voltage is determined by the number of full bridges in series with the drive. A modular transformer arrangement in accordance with the present invention utilizes a plurality of smaller input transformers to reduce the total number of secondaries required in a single transformer and allow for a more scaleable three dimensional (i.e. voltage and current) motor drive.

Thus, with a full bridge power module of the type shown in FIG. 3, each power module has three input connections and two output power connections providing a single phase output, and a number of such power modules are arranged in the fashion desired for operation with an x phase, y voltage (line-to-line) and z horsepower motor.

If each power module is designed to produce a volts (line-to-neutral) and b horsepower then the drive will require a total number of modules equal to z/b. The number of modules in series equals $y/(a*\sqrt{3})$ while the number of parallel modules per phase in the drive equals $(zlb)/(x*(y/(a*\sqrt{3})))$. The module numbers calculated in this way must be rounded up to integer values, and the resulting drive is a three dimensional structure containing power modules of the type shown in FIG. 3. Additionally, providing an even number of parallel modules offers the advantage of being able to turn off drive circuits for part power loads without adversely affecting a PWM interleaving algorithm of the type described, for example, in U.S. Pat. No. 5,935,339.

Figure 4A:
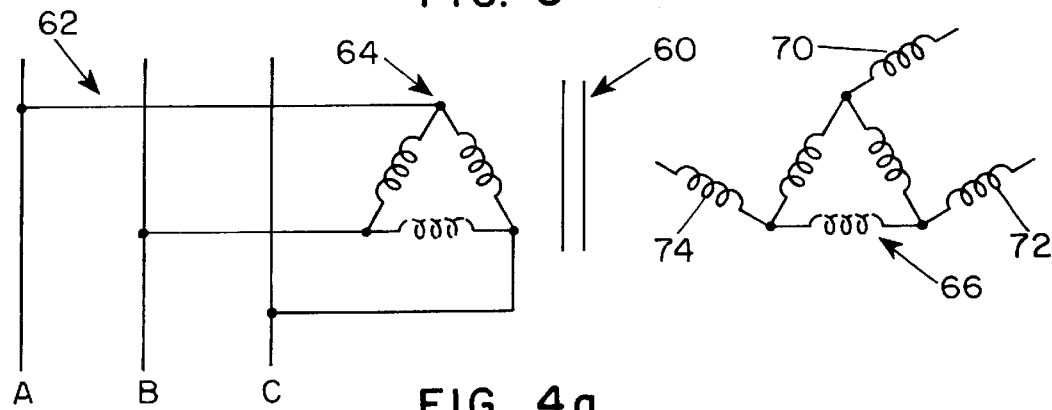
FIG. 4a is a schematic diagram illustrating typical a transformer phase shifting arrangement.
Figure 4B:
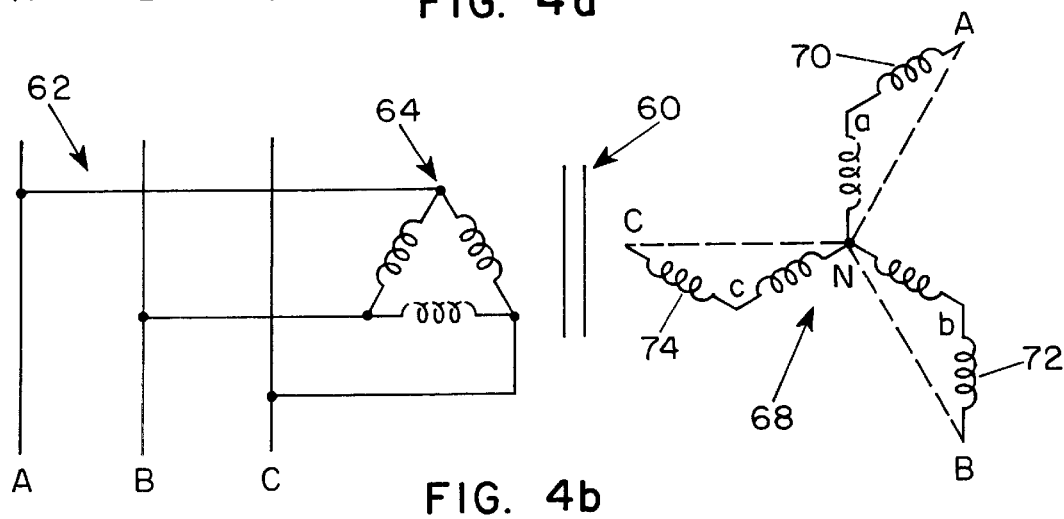
FIG. 4b is a schematic diagram illustrating another typical transformer phase shifting arrangement.

Phase shifting is often accomplished in transformers by providing an extended delta configuration in the secondary in the manner illustrated in FIG. 4a in which a transformer 60 has a three phase AC input 62 to delta connected windings 64 and an extended delta output winding arrangement 66 or a zig zag wye output winding arrangement 68 of the type shown in FIG. 4b. In each case the secondary includes windings 70, 72 and 74 constituting extensions from the delta configuration or the wye configuration which are wound on different legs of the transformer core to provide a different phase output. With these arrangements the phase of the output windings can be shifted by up to 60 degrees in either the positive or negative direction with respect to the input phases and, because all windings share the same core, core vibrations are reduced and magnetic core utilization is greatly improved.

Figure 5:
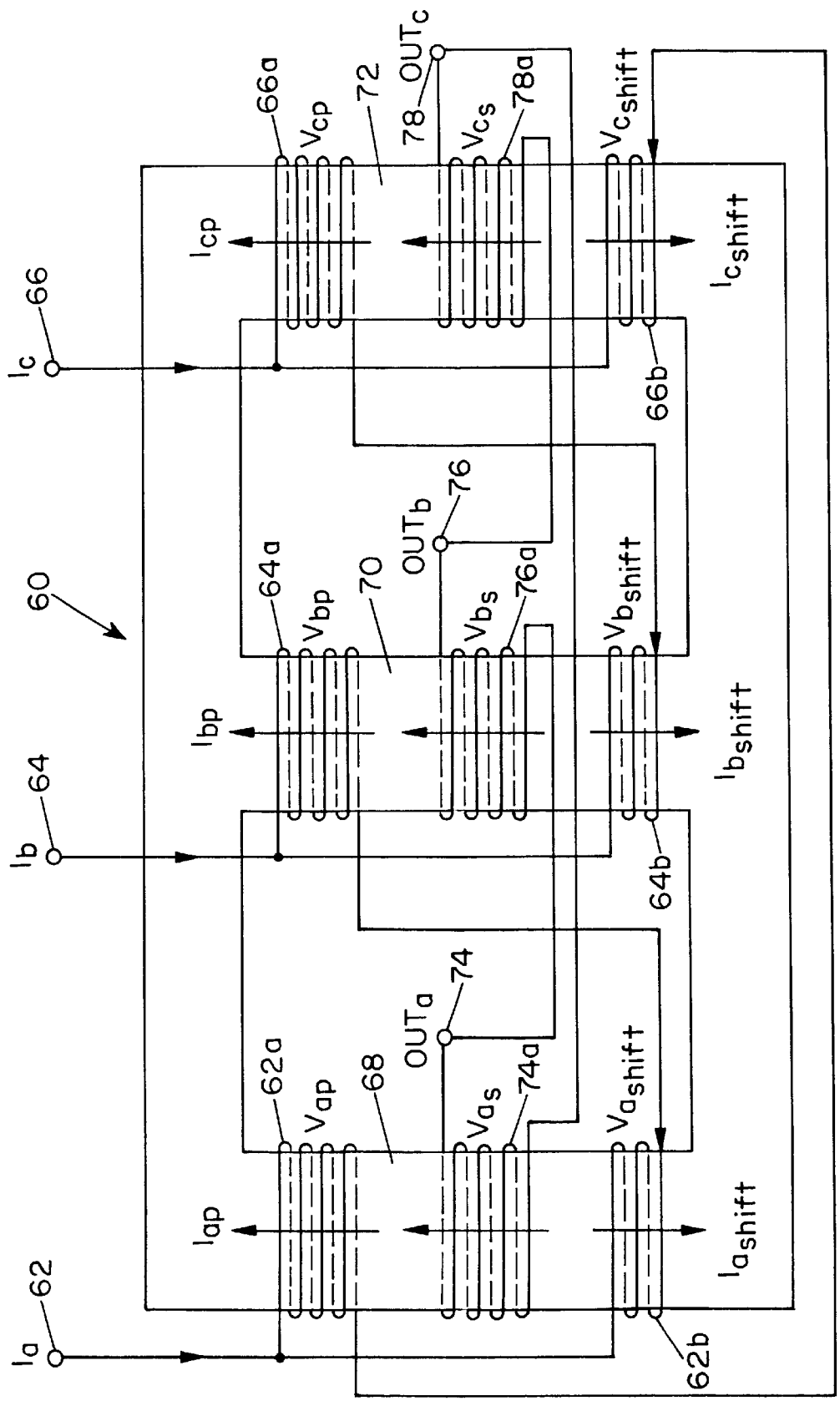
FIG. 5 is a schematic illustration showing the wiring diagram of a primary phase-shifted delta/delta transformer.

Phase shifting may also be accomplished at the primary winding of the transformer in which various types of transformer winding configurations such as delta/delta and delta/wye can provide advantages over secondary winding phase shift. FIG. 5 schematically illustrates a simplified wiring diagram for a primary phase shifted delta/delta transformer 60 having three different phase inputs 62, 64 and 66 each connected to oppositely wound coils 62a, 62b, 64a, 64b, 66a and 66b respectively on corresponding legs 68, 70 and 72 of the transformer core and providing phase shifted outputs 74, 76 and 78 from corresponding secondary windings 74a, 76a and 78a on the legs 68, 70 and 72 respectively. As indicated in the schematic wiring diagram, the opposite ends of the windings 62a, 64a and 66a respectively are connected to the opposite ends of the windings 66b, 62b and 64b respectively.

Figure 6A:
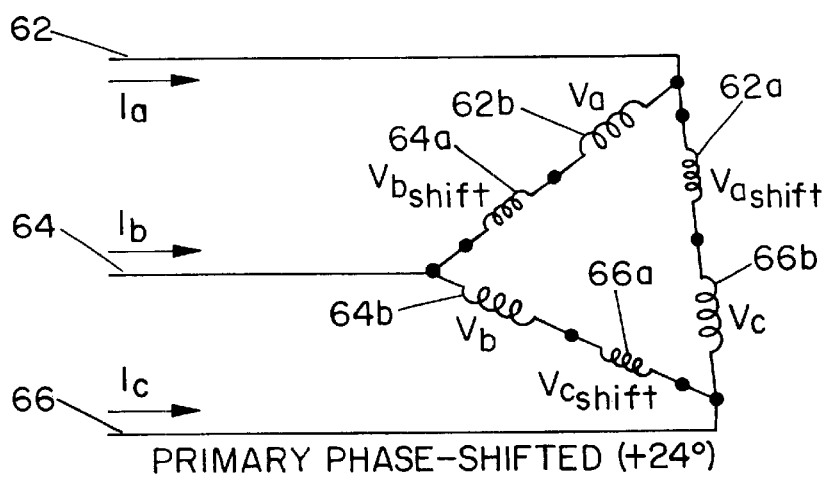
FIGS. 6a–6e are schematic illustrations showing different phase shifting arrangements in a delta/delta transformer of the type shown in FIG. 5.
Figure 6A:
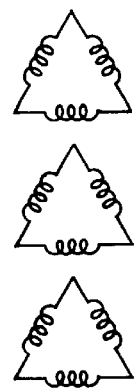
Figure 6B:
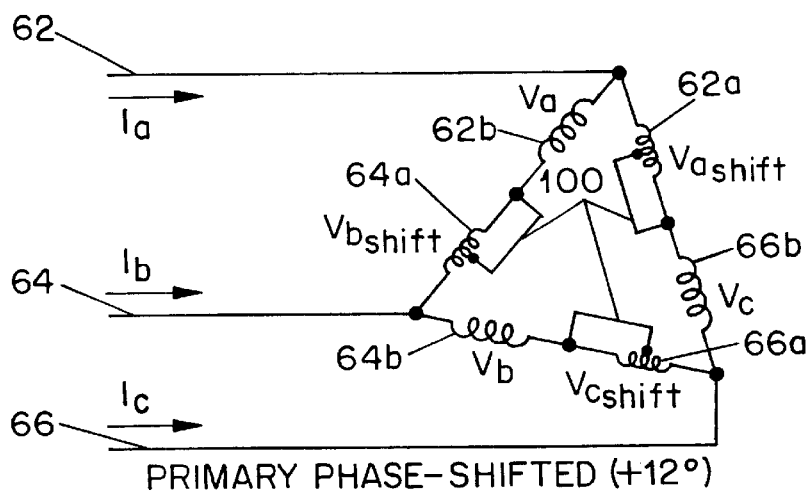
Figure 6B:
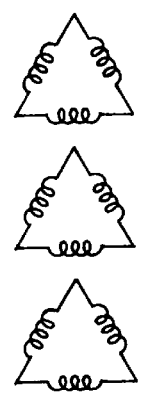
Figure 6C:
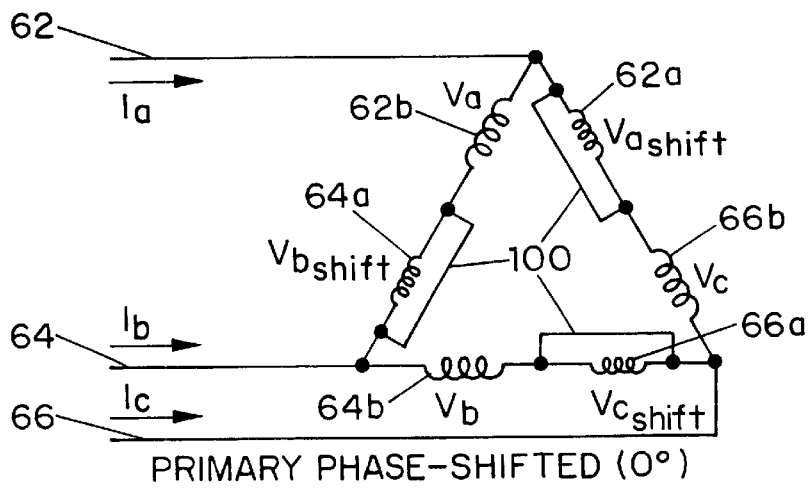
Figure 6C:
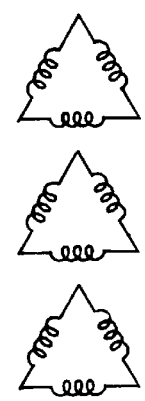
Figure 6D:
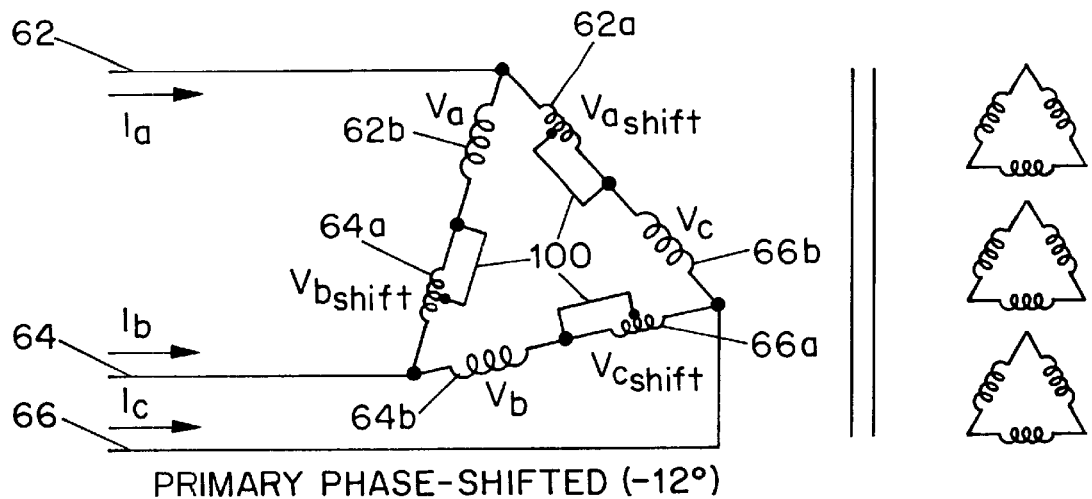

FIGS. 6a–6e illustrate schematically the different phase shift conditions which can be produced by a transformer of the type shown in FIG. 5. FIG. 6a illustrates the connections of the windings in the arrangements shown in FIG. 5 to produce a phase shift of plus 24 degrees with respect to the input phases in the primary of the transformer, producing a corresponding phase shift in the secondary windings of the transformer. FIGS. 6b, 6c, 6d and 6e show the connections by producing phase shifting in the primary of the transformer of plus 12 degrees, 0 degrees, –12 degrees and –24 degrees, respectively, by increasing or reducing the ratio between the number of turns in the windings on each of the core legs represented in those drawings and by providing a tap 100 on one of the windings in each core leg.

Such phase shifting in the primary side of the transformer is beneficial since lower currents permit a smaller diameter wire to be used and the reduced wire diameter and lower current together improve the effectiveness of smaller connections to the phase shift winding. Because of the increased number of turns in the primary winding the resolution of phase shifting is also improved. When phase shifting is accomplished in the primary of the transformer, taps 100 of the type described above can be more readily installed with smaller connections to allow for a different phase shifting angles. Consequently, with better resolution resulting from the larger number of turns available and smaller, less complex hardware, the primary phase shift structure requires less space than in higher power transformers.

Figure 7:
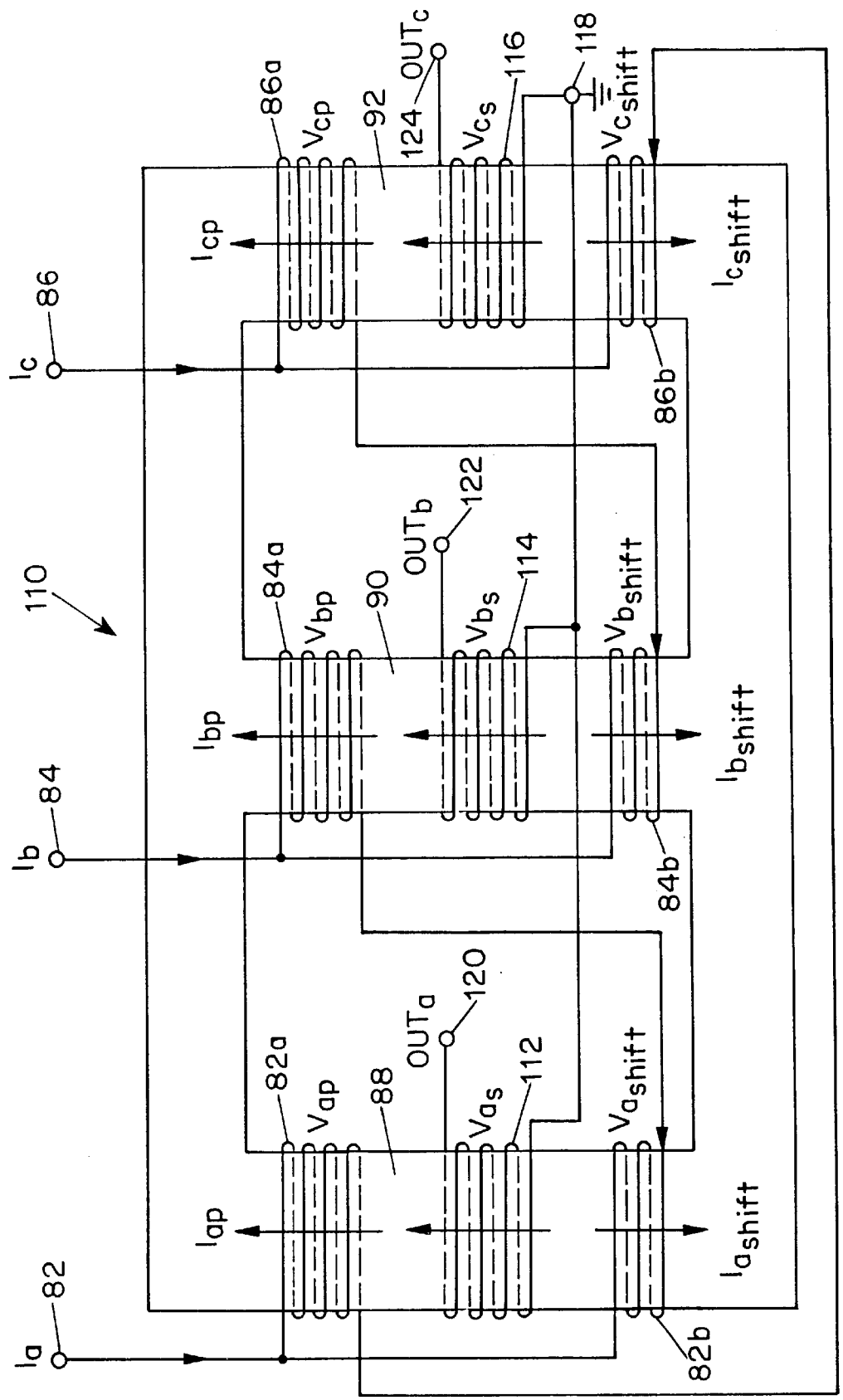
FIG. 7 is a schematic illustration showing a wiring diagram of a primary phase shifted delta/wye transformer.

Phase shifting on a primary side of the transformer can also be accomplished with other types of transformer winding configurations. A transformer arrangement having delta/delta and delta/wye input and output winding configurations provides additional benefits to overall transformer performance compared to a delta/delta winding configuration of the type shown in FIG. 5. FIG. 7 illustrates a simplified wiring diagram for a primary phase shifted delta/wye transformer 110 having delta-connected primary windings of the same type described above with reference to FIG. 5 and wye-connected secondary windings 112, 114 and 116 on the transformer core legs 88, 90 and 92 connected to a common ground 118 and providing separate outputs 120, 122 and 124. In this arrangement the secondary voltage derived as a result of the delta/wye configuration leads by 30 degrees with respect to the corresponding secondary voltage derived by a delta/delta connection. For a delta/wye configuration the phase shift angle is always 30 degrees but combining delta/delta and delta/wye transformer configurations with phase shifting performed on the primary side of the transformer reduces the required angle of phase shift.

Figure 8A:
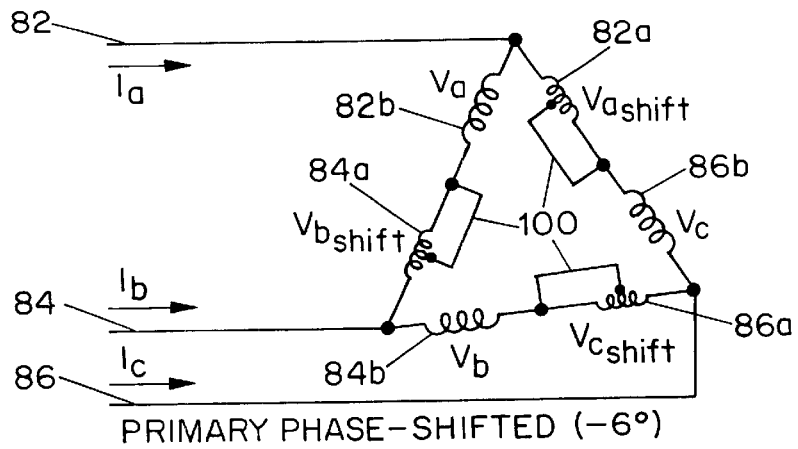
FIGS. 8a–8e are schematic illustrations showing different phase shifting arrangements for phase shifted delta/delta and delta/wye transformers.
Figure 8B:
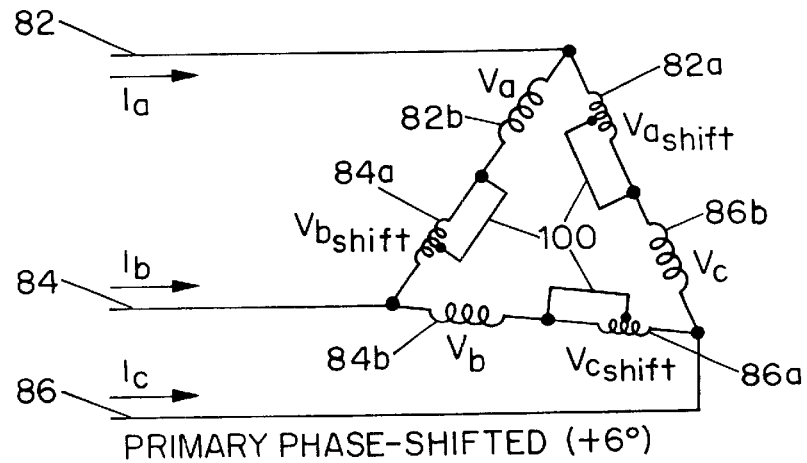
Figure 8C:
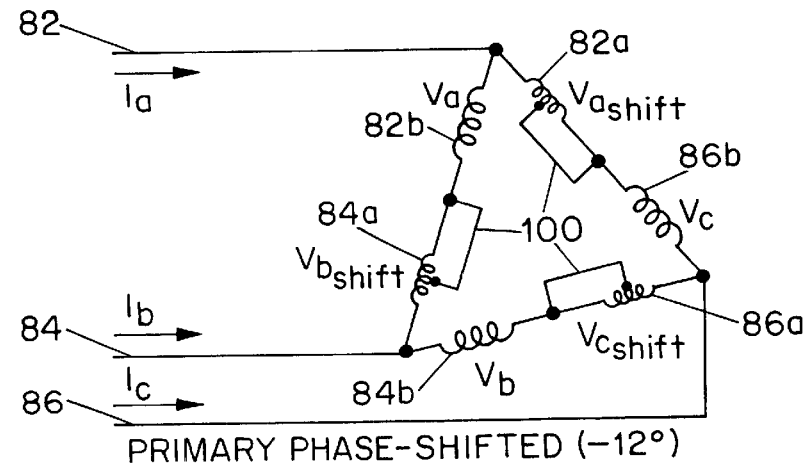
Figure 8D:
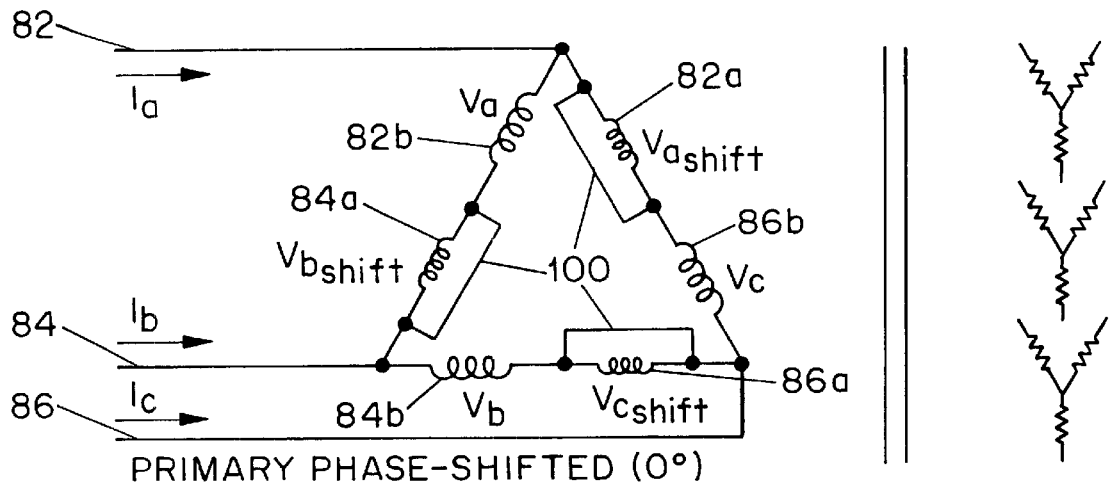

FIGS. 8a–8e show various configurations of typical primary phase shifted delta/delta and delta/wye transformer of the type shown in FIG. 7 in which the phase shifting is varied by the use of shunts 100 as described with respect to FIGS. 6a–6e. The arrangement shown in FIG. 8a provides a phase shift of –6 degrees for the output with respect to the standard delta/delta configuration shown in FIG. 7 whereas the arrangement shown in FIG. 8b has a phase shift of +6 degrees with respect to the standard delta/delta configuration shown in FIG. 7. FIG. 8c, which has a primary phase shift of –12 degrees produces an 18 degree phase shift at the output with respect to the standard delta/wye configuration shown in FIG. 7 while FIG. 8d, which has a 0 degree primary phase shift, produces a phase shift of 30 degrees with respect to a standard delta/wye configuration of the type shown in FIG. 7 and FIG. 8e which has a primary phase shift of +12 degrees produces a phase shift at the output of 42 degrees with respect to the standard delta/wye configuration.

Figure 6E:
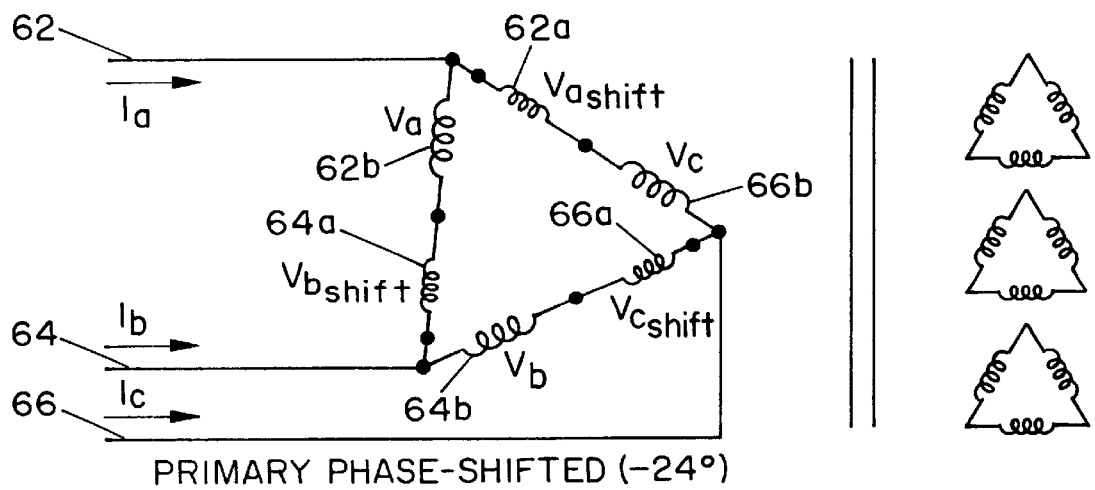
Figure 8E:
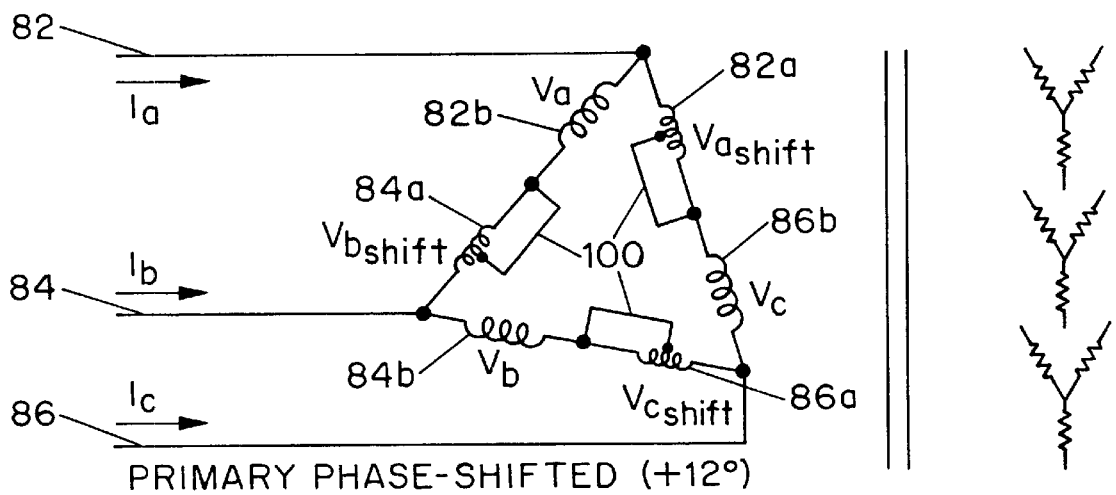

Thus, combining delta/delta and delta/wye transformer configurations with phase shifting performed on the primary side reduces the required angle of phase shift so that maximum primary phase shift angle requirement is reduced by 50% as shown, for example, by a comparison of FIGS. 6e and 8e.

Figure 9:
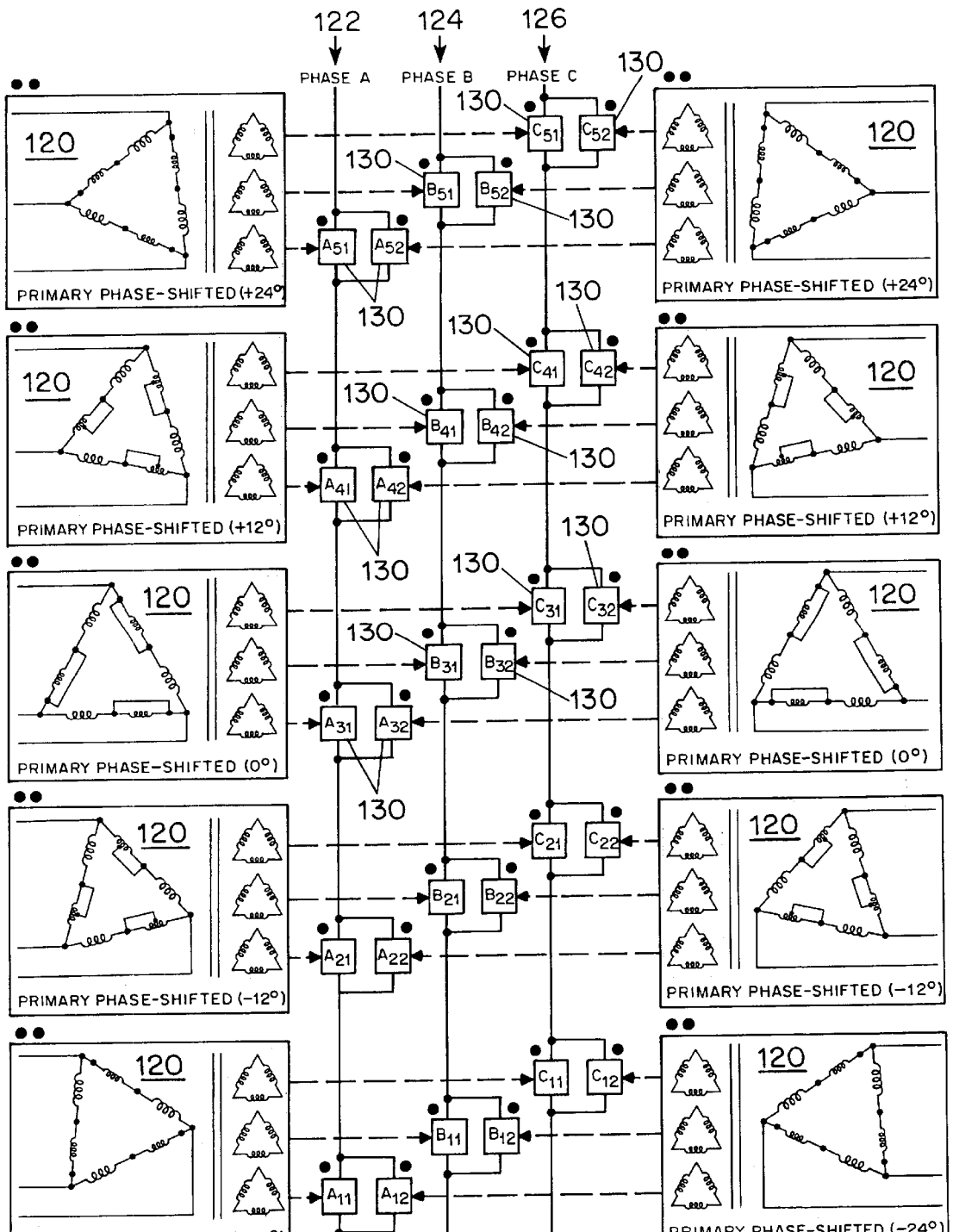
FIG. 9 is a schematic diagram illustrating a representative phase shifted delta/delta transformer arrangement containing series/parallel connected power modules configured for a 12,000 HP motor drive.

FIG. 9 illustrates a representative embodiment of a modular transformer arrangement utilizing eight phase-shifted delta/delta transformer modules with series/parallel connections configured for a 12,000 horse power motor drive. In this arrangement ten transformer modules 120 of the type shown, for example, in FIG. 6 are connected so as to provide isolated inputs for the full bridges of three multi-level phase drivers 122, 124 and 126 of the type described above with reference to FIG. 2. This arrangement is especially useful for a large motor drive in which transformer volume and weight can become excessive because of the transformer core size and secondary connections and the cooling methods required. When high pulse number systems are necessary for improved quality, i.e. reduced system harmonics, multiple secondaries with phase shifted outputs are required so that a single large core may be physically impracticable in such applications. Consequently, a modular three dimensional transformer design of the type shown in FIG. 9 can be utilized to avoid complexities and restrictions of a single large transformer design for such applications.

The theoretical maximum line-to-neutral output voltage of a multi-level drive of the type shown in FIG. 9 is given by:

$$V_{(RMS)L-N} = \frac{Levels}{\sqrt{2}} V_{DC}$$

where levels (RMS)L–N is the number of series full bridges in the drive and VDC is the DC link voltage per level or full bridge. In order to obtain an AC output voltage of about 480 volts RMS the transformer secondary output voltage must be approximately 600 volts RMS.

To avoid large variations in transformer design as power level requirements vary from drive to drive and to avoid the disadvantages of a single large transformer which is difficult to manufacture, install and replace, a modular three dimensional transformer configuration of the type discussed above is utilized. Furthermore, when an arrangement of modules is provided in a modular bank, phase shifted transformers provide higher pulse numbers when supplying modular six pulse rectifier loads. Transformer configurations such as modular secondary phase shifting transformers using zig zag or extended delta windings or primary phase shifting windings in which the overall degree of phase shifting is minimized are preferred. A modular transformer arrangement of the type shown in FIG. 9, which is a high power design that can be accommodated with multiple smaller phase shifted modular transformers providing isolated phase shifted power to power conversion equipment for driving a motor at variable speed, for example, is a preferred arrangement since the modular transformer design has the ability to add or subtract transformer units as power modular configuration requirements change.

The typical arrangement shown in FIG. 9 in which each of the transformer modules 120 is a one megawatt transformer module and each of the power modules 130 in the multi-level inverters 122, 124 and 126 is a 315 kW power module, is rated for 10 megawatts with each of the transformer modules 120 rated at one megawatt and each of the 30 power converter modules rated at 315 kW. Each of the modular input transformers 120 provides three 315 kW three phase, 575 VRMS isolated secondaries. The transformer primaries are phase shifted relative to each other to increase the resultant effective pulse number supplied by the inverter. The arrangement shown in FIG. 9 presents fifteen phases to the modular power converter rectified loads, resulting in a thirty pulse system.

Thus, as shown in FIG. 9, power converter modules and transformers are connected in series and parallel utilizing three phase power and five levels with two circuits to achieve the required motor voltage and current rating and the output of the drive provides a three phase variable voltage, variable frequency with low harmonic content to a propulsion motor to which the power is supplied. This arrangement minimizes the design effort required to reconfigure power supply equipment for higher or lower power levels.

Figure 10:
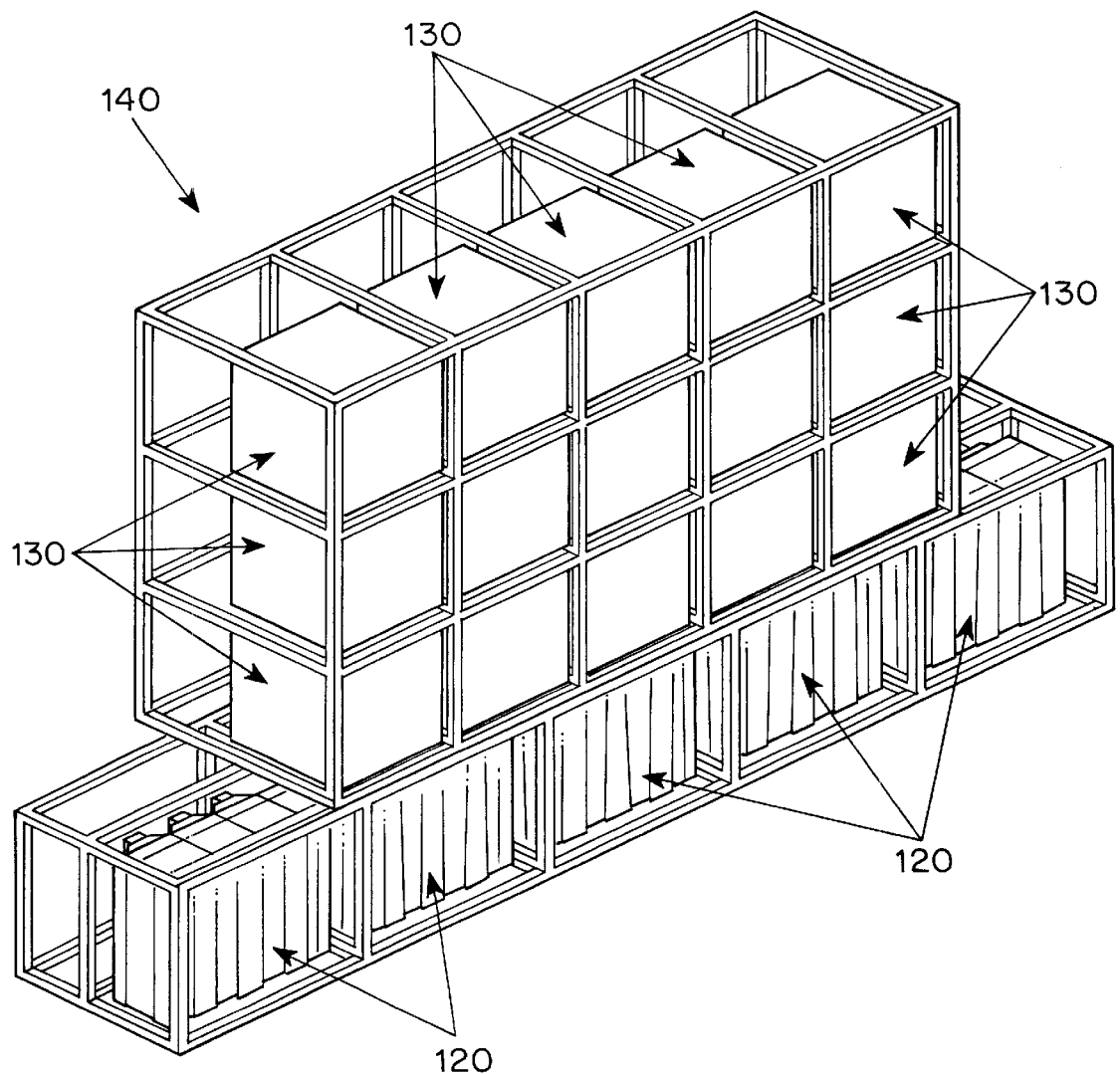
FIG. 10 is a schematic perspective view showing a representative embodiment of a transformer and power conversion module arrangement with each module mounted in a separate enclosure.
Figure 11:
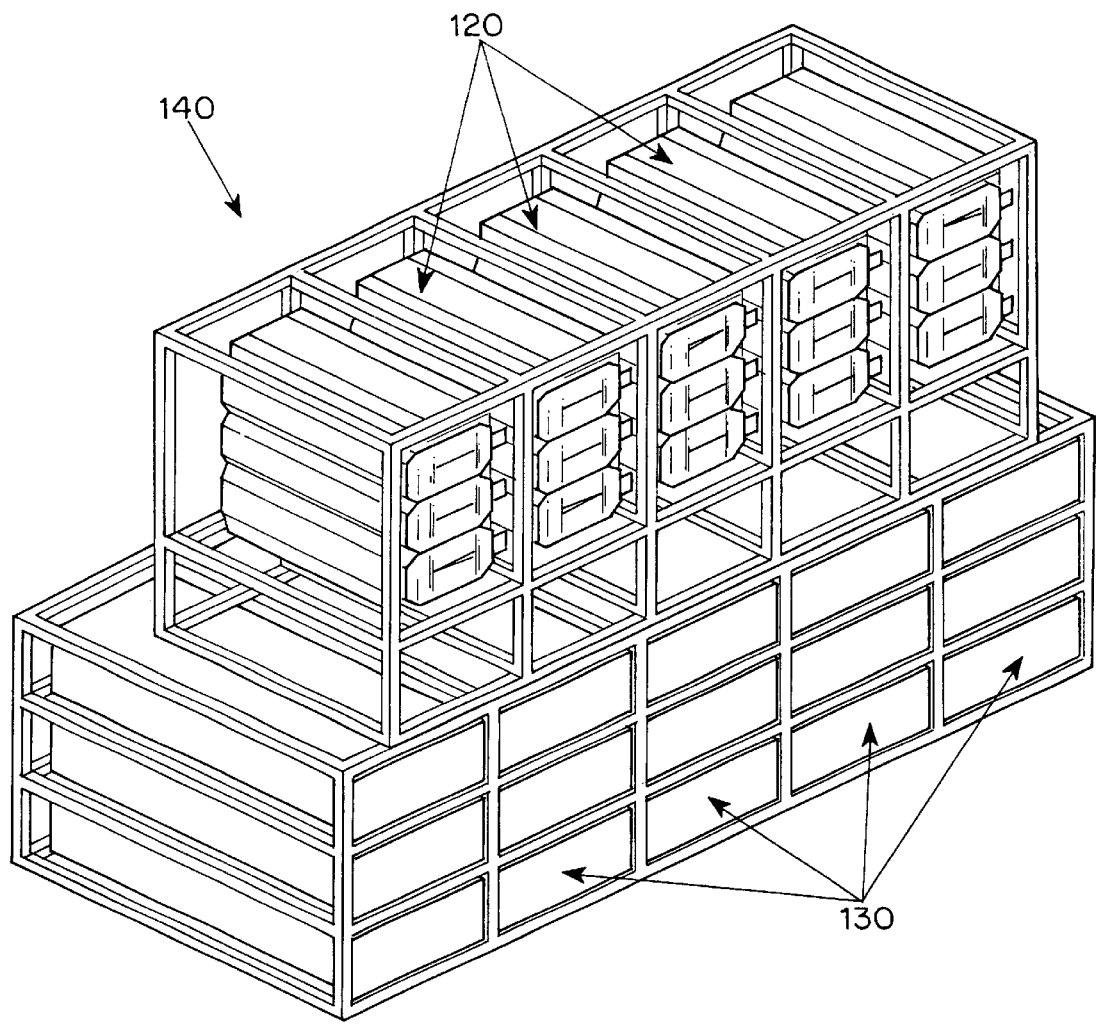
FIG. 11 is a schematic perspective view showing another transformer and power converter module arrangement with each module mounted in a separate enclosure.
Figure 12:
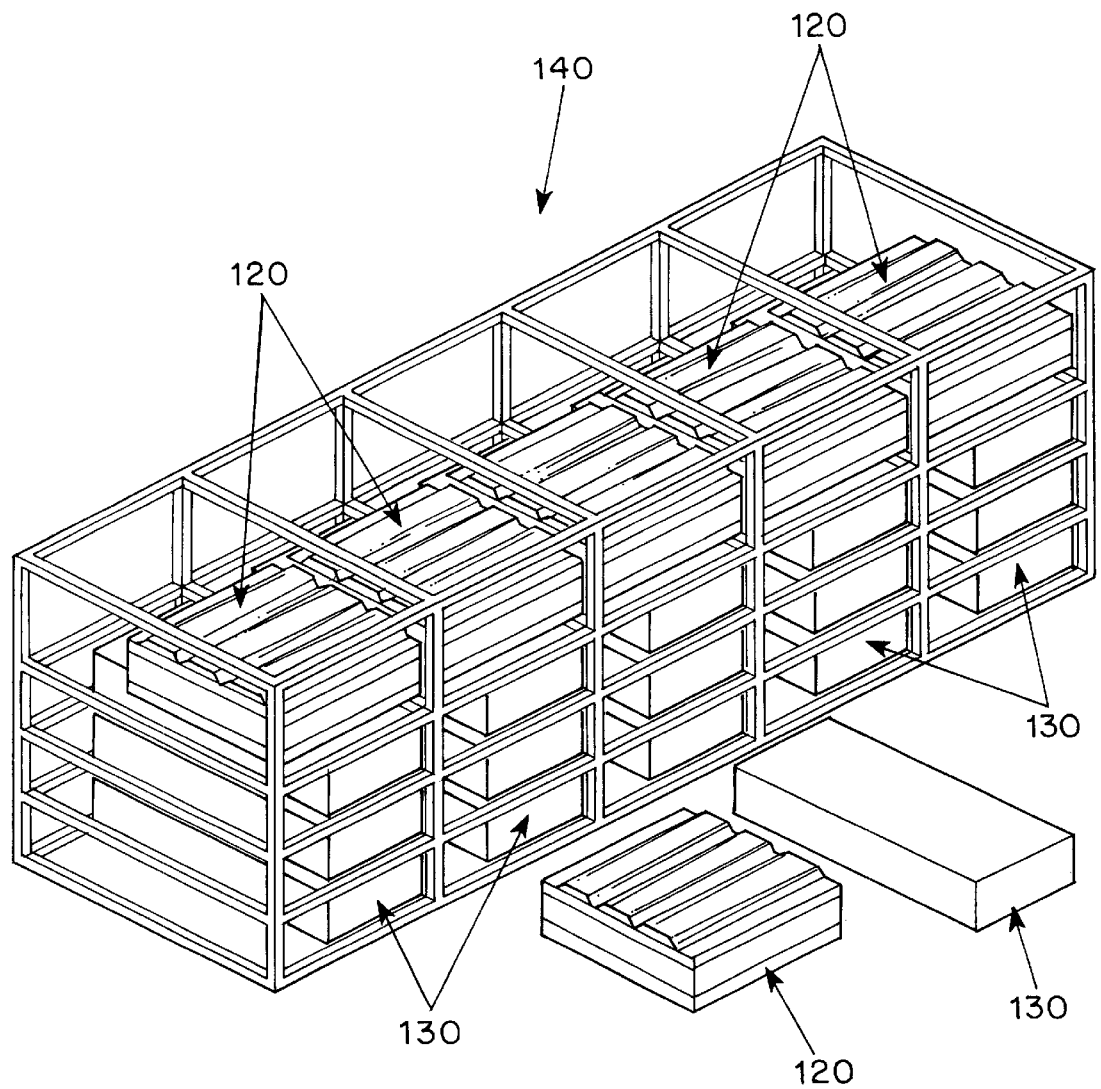
FIG. 12 is a schematic perspective view illustrating a representative embodiment of a transformer and power conversion module arrangement with the modules assembled in the same enclosure.
Figure 13:
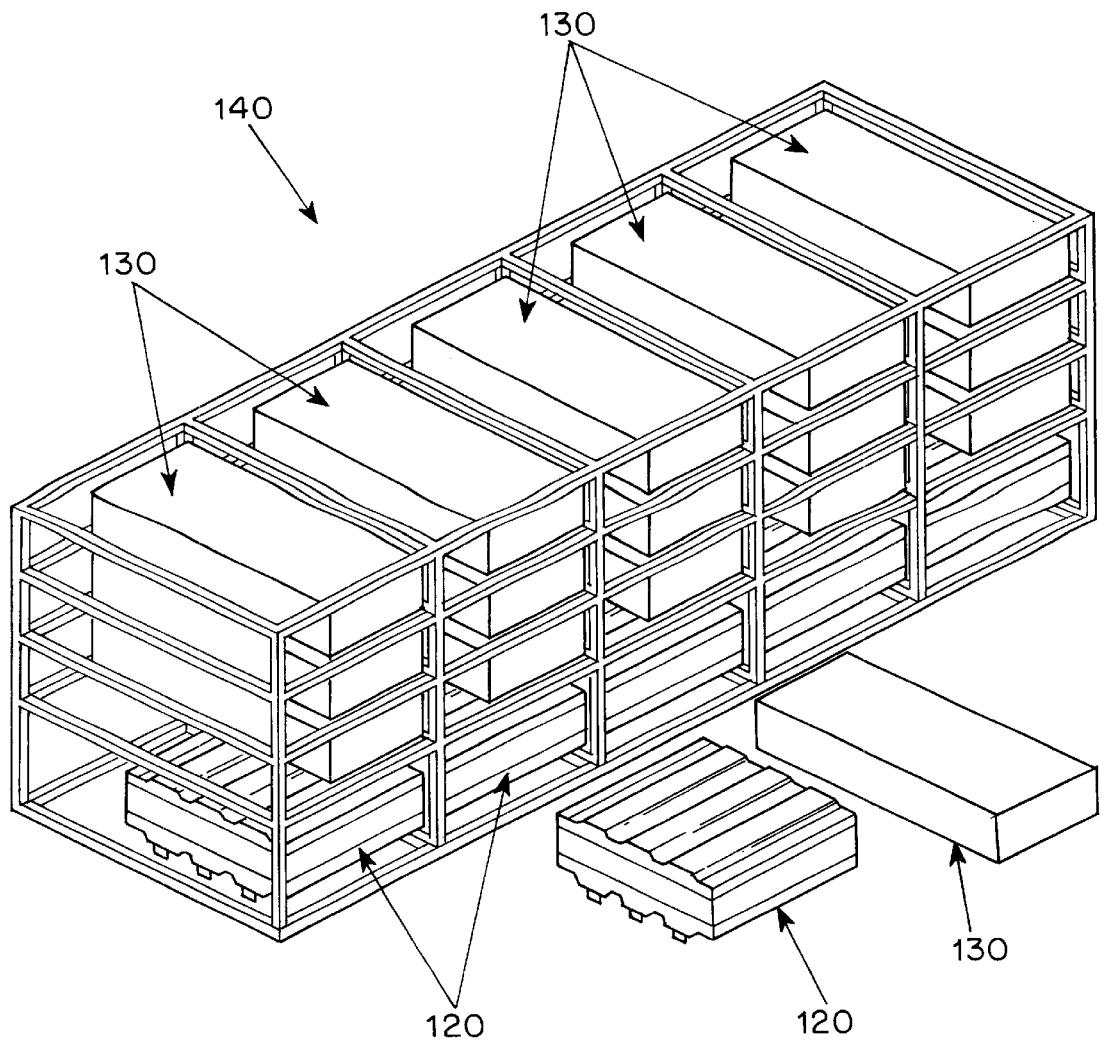
FIG. 13 is a schematic perspective view showing another transformer and power converter module arrangement with the transformer modules in the same enclosure.

With a modular three dimensional transformer arrangement, an enclosure 140 of the type shown in FIG. 10 can be arranged to utilize the optimum configuration for any application while maintaining flexibility for other installations. As shown in FIG. 10, each drive module 130 is contained in a separate compartment of the enclosure 140 and each transformer 120 is also contained in a separate compartment. If appropriate, the power arrangement shown in FIG. 9 can also be supplied by two larger five megawatt transformers, one for each drive circuit, instead of five smaller one megawatt transformer modules. Table 1 below gives a comparison of size, weight, volume and type of transformer for one megawatt and five megawatt transformers.

TABLE 1

| Rating (MW) | Type | Size (H x W x D) (in) | Volume (ft$^3$) | Weight (lbs) |
|---|---|---|---|---|
| 1 | Dry | 69 x 69 x 52 | 143.3 | 6200 |
| 5 | Dry | 108 x 102 x 64 | 408 | 24500 |

As shown in Table 1, because of their significantly lower weight and smaller size, the use of five commercial one megawatt transformer modules on each side of the system shown in FIG. 9 permits improved handling arrangement and removal of each transformer module as compared to use of a single larger five megawatt transformer.

With advanced cooling methods transformer size and weight is significantly reduced which provides additional benefits in cabinet design flexibility, handling and arranging of transformer modules in various applications. Table 2 below shows the size, weight and volume of advanced water cooled transformers of one megawatt and five megawatt ratings.

TABLE 2

| Rating (MW) | Type | Size (H x W x D) (in) | Volume (ft$^3$) | Weight (lbs) |
|---|---|---|---|---|
| 1 | Water Cooled | 39 x 49.5 x 22.5 | 23.2 | 2850 |
| 5 | Water Cooled | 54.6 x 117.7 x 26.5 | 98.6 | 7483 |

The cabinet design flexibility resulting from the use of smaller modular transformers rather than larger transformers is illustrated in FIGS. 10–13 which show the physical arrangement of transformer and power converter modules mounted in separate enclosures and a plurality of transformer and power converter modules mounted in a fixed array in the same enclosure. Thus, the use of smaller modules allows the transformers to be arranged either in separate cabinets from the power converter modules or integrated in a single cabinet with the power converter modules.

Although the invention has been described herein with reference to specific embodiments, many modifications and variations therein will readily occur to those skilled in the art. Accordingly all such variations and modifications are included within the intended scope of the invention.

We claim:

1. A modular transformer arrangement comprising a plurality of transformer modules, each transformer module having a plurality of primary windings and a plurality of isolated secondary windings, and a power conversion arrangement having a plurality of power converters modules with separate inputs connected to receive power from the isolated secondary windings of the plurality of transformers respectively.

2. A modular transformer arrangement in accordance with claim 1 in which the power converter modules each includes a plurality of full bridges each having an input connected to one of the transformer module secondary windings and having outputs connected in series to produce a high voltage power supply.

3. A modular transformer arrangement according to claim 2 including a second plurality of transformer modules supplying separate inputs of a second plurality of power converters in the power conversion arrangement connected in parallel with the plurality of power converters.

4. A modular transformer arrangement according to claim 1 wherein each transformer module has a plurality of delta connected primary windings and a plurality of delta connected secondary windings.

5. A transformer arrangement according to claim 1 wherein each transformer module has a plurality of extended delta connected primary windings, each providing a phase shift, and a plurality of delta connected secondary windings.

6. A modular transformer arrangement according to claim 5 wherein the extended delta connected primary windings of each transformer module provide a different phase shift from the extended delta connected primary windings of another transformer module of the plurality.

7. A modular transformer arrangement according to claim 1 wherein each transformer module has a plurality of secondary windings producing output power of different phases and the power conversion arrangement provides a corresponding plurality of output phases.

8. A modular transformer arrangement according to claim 1 wherein each transformer module has a plurality of extended delta connected primary windings and a plurality of extended delta connected secondary windings.

9. A modular transformer arrangement according to claim 1 wherein each transformer module has a plurality of extended delta connected primary windings and a plurality of wye connected secondary windings.

10. A modular transformer arranged according to claim 1 wherein each transformer module has a plurality of extended delta connected primary windings and a plurality of zig zag wye connected secondary windings.

11. A modular transformer arrangement according to claim 1 including a housing for housing the plurality of transformer modules and power converter modules in which each transformer is mounted in a separate enclosure in the housing and each power converter module is mounted in a separate enclosure in the housing.

12. A modular transformer arrangement according to claim 1 including a housing for the transformer and power converter modules in which all of the transformer modules and power modules are mounted in the same enclosure.

13. A modular transformer arrangement according to claim 1 including a housing for the transformer modules and power converter modules in which all of the transformer modules are mounted in one enclosure and all of the power converter modules are mounted in another enclosure.

* * * * *